(12) United States Patent
Hoelsæter

(10) Patent No.: US 8,456,503 B2
(45) Date of Patent: Jun. 4, 2013

(54) METHOD AND DEVICE FOR AUTOMATIC CAMERA CONTROL

(75) Inventor: Håvard Hoelsæter, Oslo (NO)

(73) Assignee: Cisco Technology, Inc., San Jose, CA (US)

( * ) Notice: Subject to any disclaimer, the term of this patent is extended or adjusted under 35 U.S.C. 154(b) by 364 days.

(21) Appl. No.: 12/968,418

(22) Filed: Dec. 15, 2010

(65) Prior Publication Data

US 2011/0141222 A1    Jun. 16, 2011

Related U.S. Application Data

(60) Provisional application No. 61/282,099, filed on Dec. 16, 2009.

(30) Foreign Application Priority Data

Dec. 16, 2009  (NO) .................................... 20093535

(51) Int. Cl.
*H04N 7/14*    (2006.01)

(52) U.S. Cl.
USPC ...................................................... 348/14.01

(58) Field of Classification Search
None
See application file for complete search history.

(56) References Cited

U.S. PATENT DOCUMENTS

| 8,184,175 B2 * | 5/2012 | Mooradian et al. ........ 348/222.1 |
| 2005/0134685 A1 | 6/2005 | Egnal et al. |
| 2006/0077258 A1 * | 4/2006 | Allen et al. .................... 348/169 |

FOREIGN PATENT DOCUMENTS

| EP | 0 269 283 A1 | 6/1988 |
| JP | 2007-128390 | 5/2007 |
| WO | WO 92/03700 | 3/1992 |
| WO | WO 03/030558 A1 | 4/2003 |

OTHER PUBLICATIONS

International Search Report for Norwegian Application No. 20093535 filed Dec. 16, 2009.

* cited by examiner

*Primary Examiner* — Duc Nguyen
*Assistant Examiner* — Theodore Ndje
(74) *Attorney, Agent, or Firm* — Oblon, Spivak, McClelland, Maier & Neustadt, L.L.P.

(57) ABSTRACT

A method including: obtaining a sequence of pictures from a camera associated with a video conferencing endpoint; determining a presence of a target point coinciding with an optical source within a field of view of the camera, wherein the optical source emits pulses of electromagnetic radiation at a rate that causes the camera to capture some frames with a pulse of electromagnetic radiation from the optical source and some frames without the pulse of electromagnetic radiation from the optical source; determining a location of the target point within one or more of the pictures by comparing a first frame from the camera that includes the pulse of electromagnetic radiation from the optical source and a second frame from the camera that does not include the pulse of electromagnetic radiation from the optical source; moving the camera so that a center of one or more subsequent pictures obtained by the camera coincides with the target point; and zooming the camera until receipt of an instruction to stop zooming is received, or until maximal zoom is achieved.

15 Claims, 4 Drawing Sheets

METHOD AND DEVICE FOR AUTOMATIC CAMERA CONTROL

CROSS-REFERENCE TO RELATED APPLICATIONS

The present application claims the benefit of priority of U.S. provisional application Ser. No. 61/282,099, filed Dec. 16, 2009, the entire contents of which are incorporated herein by reference. The present application also claims priority to Norwegian patent application no. NO20093535, filed Dec. 16, 2009, the entire contents of which are incorporated herein by reference.

TECHNOLOGICAL FIELD

The technological advancement described herein relates to a system and method for automatically adjusting a camera control associated with a video conferencing endpoint, and more specifically to a system and method for automatically adjusting the pan, tilt and zoom of a video conference camera to capture an area of interest.

BACKGROUND

Conventional videoconferencing systems comprise a number of end-points communicating real-time video, audio and/or data (often referred to as duo video) streams over and between various networks such as WAN, LAN and circuit switched networks.

In most high end video conferencing systems, high quality cameras with pan-, tilt-, and zoom capabilities are used to capture a view of the meeting room and the participants in the conference. The cameras typically have a wide field-of-view (FOV), and high mechanical pan, tilt and zooming capability. This allows for both good overview of a meeting room, and the possibility of capturing close-up images of participants and objects. The video stream from the camera is compressed and sent to one or more receiving sites in the video conference.

All sites in the conference receive live video and audio from the other sites in the conference, thus enabling real time communication with both visual and acoustic information.

During a video conference, participants at a local site often wish to share certain visual details of physical objects with the remote site. A typical example of this is the designer(s) of a product (e.g. a shoe) wants to discuss manufacturing problems with the manufacturer which is located on another continent. In order to show details of the manufacturing defect/challenges, the manufacturer can zoom in on the product (the shoe) and point at points/areas on the product while discussing how to solve the problem with the designer. In other situations, participants may want to share information only accessible on paper, like images, diagrams, drawings or even text. Today's high quality video conference cameras are certainly capable of providing close up images of such objects. However, in order to show such details of objects, the local user must manually adjust the cameras pan, tilt and zoom to capture the desired view.

Adjustments to the camera are typically done using a standard input device, such as a keypad on a remote control or a mouse by manually controlling the cameras pan, tilt and zoom. Typically a traditional IR remote control with standard push-buttons is used to adjust the camera. A standard setup is a set of four arrow keys to control the pan and tilt, and a zoom-in and zoom-out button to control the zoom.

Manually adjusting the cameras pan/tilt/zoom to capture such small details, as described above, is a tedious and time consuming process. First, a user must activate camera control by navigating through several on-screen menu's provided by the video conference system. Secondly, when camera control is activated, a user must manually adjust the camera using the arrow keys on the remote control. This is often an iterative process of alternately adjusting the zoom and pan/tilt.

Further, even though the camera's pan-tilt mechanism includes small step motors (allowing "high resolution" movement), the video conferencing system is often configured to move the camera in steps to spare the user from excessive key pushing. This works as intended when the camera is in a wide FOV. However it may cause trouble when the camera is zoomed in since the steps then become quite large.

Therefore, finding the optimal camera adjustment for known systems often require several iterations of pushing buttons on a remote control and/or an on-screen menu system, which makes it cumbersome, distractive and time-consuming.

SUMMARY

An exemplary embodiment described herein pertains to a method that includes: obtaining a sequence of pictures from a camera associated with a video conferencing endpoint; determining a presence of a target point coinciding with an optical source within a field of view of the camera, wherein the optical source emits pulses of electromagnetic radiation at a rate that causes the camera to capture some frames with a pulse of electromagnetic radiation from the optical source and some frames without the pulse of electromagnetic radiation from the optical source; determining a location of the target point within one or more of the pictures by comparing a first frame from the camera that includes the pulse of electromagnetic radiation from the optical source and a second frame from the camera that does not include the pulse of electromagnetic radiation from the optical source; moving the camera so that a center of one or more subsequent pictures obtained by the camera coincides with the target point; and zooming the camera until receipt of an instruction to stop zooming is received, or until maximal zoom is achieved.

Another exemplary embodiment includes a non-transitory computer readable storage medium encoded with instructions, which when executed by a computer cause the computer to implement the above-noted method.

Another exemplary embodiment includes a video conferencing endpoint comprising: a video conferencing unit configured to obtain a sequence of pictures from a camera, wherein the camera is configured to pan, tilt, and zoom; a targeting device including a optical source that emits electromagnetic radiation; a first controller configured to determine a presence of a target point coinciding with the optical source within a field of view of the camera, wherein the optical source emits pulses of electromagnetic radiation at a rate that causes the camera to capture some frames with a pulse of electromagnetic radiation from the optical source and some frames without the pulse of electromagnetic radiation from the optical source, to determine a location of the target point within one or more of the pictures by comparing a first frame from the camera that includes the pulse of electromagnetic radiation from the optical source and a second frame from the camera that does not include the pulse of electromagnetic radiation from the optical source, to cause the camera to move so that a center of one or more subsequent pictures obtained by the camera coincides with the target point, and to cause the camera to zoom until receipt of an instruction to stop zooming is received, or until maximal zoom is achieved.

BRIEF DESCRIPTION OF THE DRAWINGS

The foregoing and other objects, features and advantages of the non-limiting embodiments described herein will be apparent from the following more particular description, as illustrated in the accompanying drawings in which like reference characters refer to the same parts throughout the different views.

The drawings are not necessarily to scale, emphasis instead being placed upon illustrating the present technological advancement.

DETAILED DESCRIPTION

In the following, the non-limiting embodiments will be discussed by referring to the accompanying drawings. However, people skilled in the art will realize other applications and modifications may be made.

The non-limiting embodiments relate to a device and method for automatically adjusting the pan, tilt and zoom of one or more cameras associated with a local video conference endpoint, to capture a close-up view of an area/point of interest.

A user of a video conference endpoint provides a target point visible to the endpoint's camera. The target point may be an optical source, placed by a user on or near a point of interest in front of the camera. Alternatively the target point may be provided by a user pointing a laser beam, or another similar optical source, at a point of interest (typically on an object). By analyzing the pictures captured by the camera, a processor localizes the target point in the picture(s) and determines the amount of pan and tilt needed to move the camera such that the camera's view is centered on the location defined by the target point. When the amount of pan and tilt is determined, panning, tilting and zooming of the camera commences. The camera continues to zoom until the maximum zoom of the camera is reached or until the user indicates that zooming should stop. Alternatively, the camera may be programmed to zoom to a predetermined level, wherein the user may input a command indicating that further zoom is required. The picture analysis process a may be running continuously to automatically detect target points. However, in a preferred embodiment, the picture analysis process is initiated by a user.

Figure 1:
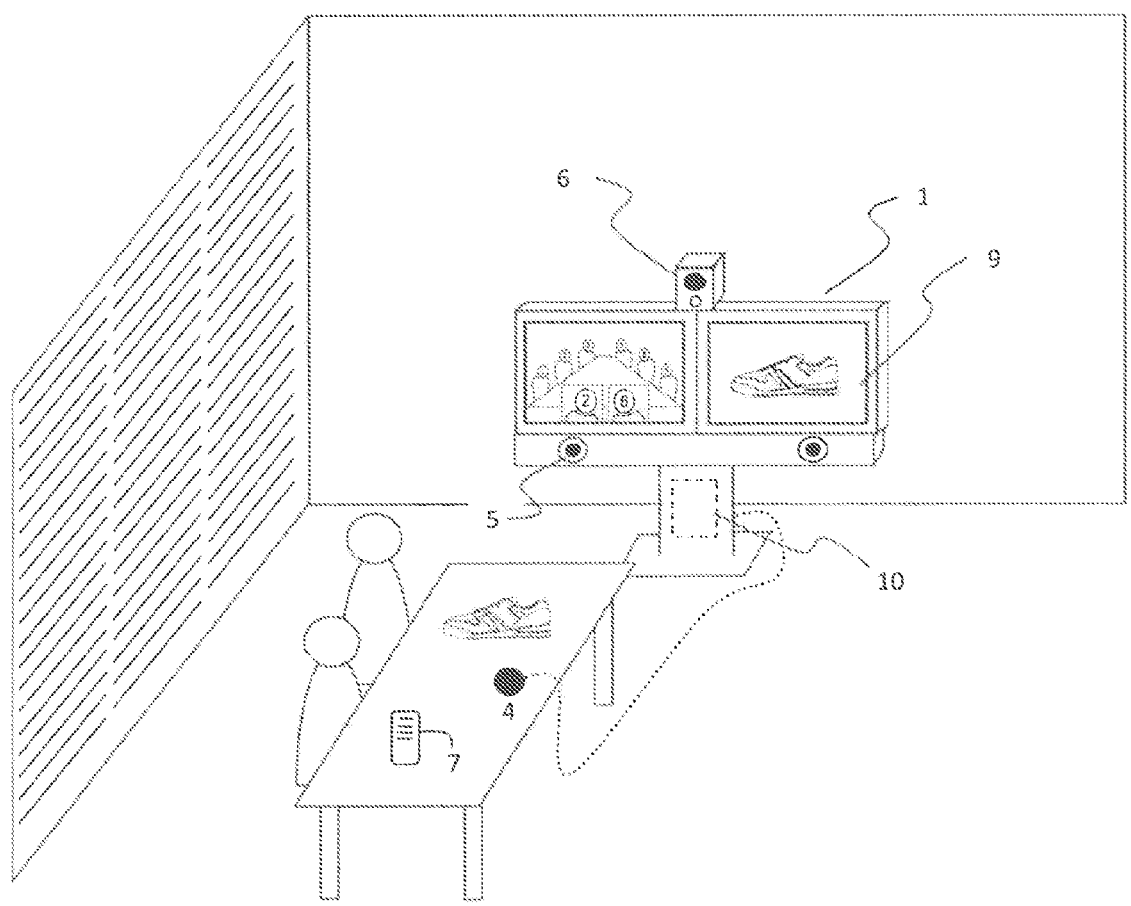
FIG. 1 is a schematic overview of an exemplary video conferencing endpoint.

FIG. 1 is an illustration of a videoconferencing endpoint 1. The videoconferencing system 1 includes at least a videoconferencing unit 10, one or more displays 9, at least one pan/tilt/zoom enabled video camera 6, and one or more input devices 7. The videoconferencing endpoint 1 can further include one or more peripheral devices, such as a computer (either laptop or desktop), a Digital Versatile Disc (DVD) player, etc. In one embodiment, the videoconferencing unit 1 is a TANDBERG Codec C90, C60, MPX 6000 or MPX 3000, and the video camera 6 is a TANDBERG PrecisionHD 1080p Camera or a TANDBERG PrecisionHD 720p Camera, all products from the Assignee of the present disclosure.

The videoconferencing unit 10 is used to establish and conduct a videoconference with remote endpoints (not shown) via a network. The videoconferencing unit 10 is connected to one ore more cameras 6, one or more displays 9, one or more speakers 5, and one or more microphones 4.

Depending on the implementation, the videoconferencing unit 1 can have other common components, such as an Infrared (IR) detector for receiving IR signals from a input device (standard remote control) 7. The camera may comprise hardware, such as processing units and memory, allowing the camera to store computer programs and perform logic operations independently of external computers. The optical sensor in the camera may be a CCD image sensor or a CMOS sensor.

Figure 2:
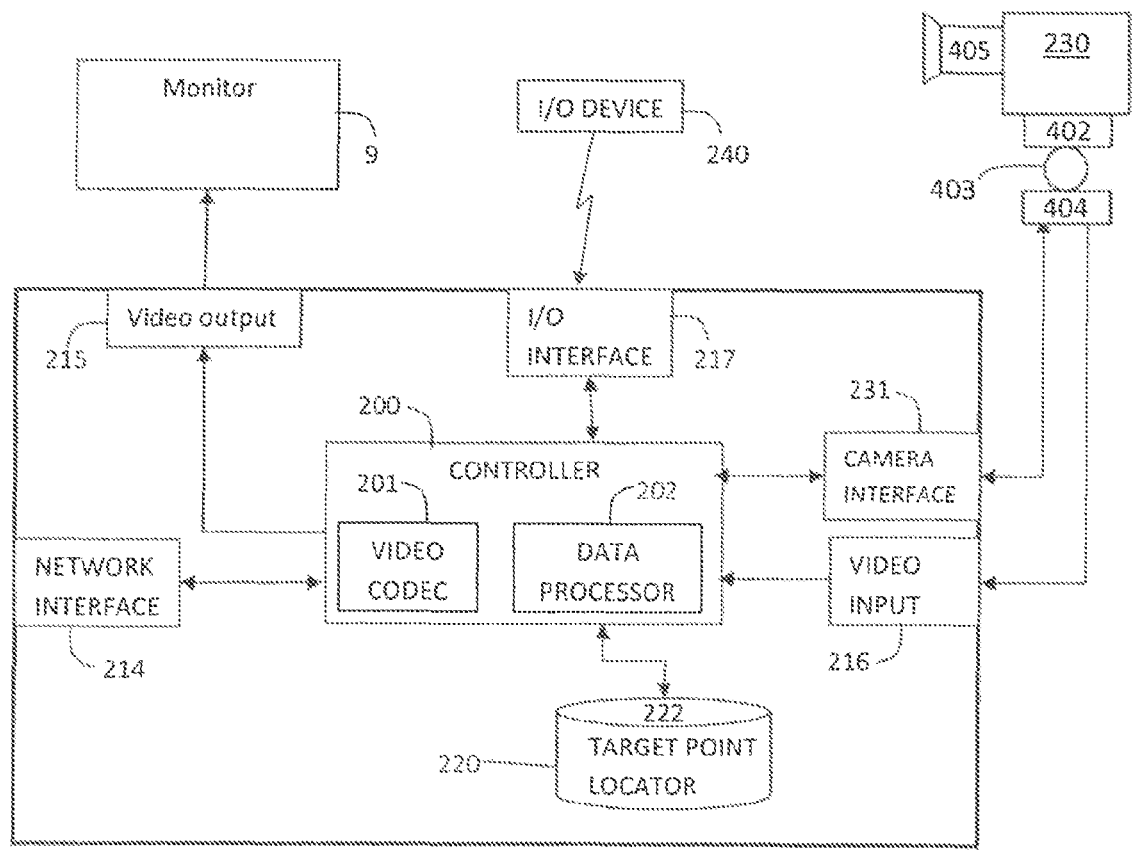
FIG. 2 is a block diagram of one non-limiting embodiment of a video conferencing endpoint.

Referring now to FIG. 2, the exemplary videoconferencing endpoint 1 is schematically illustrated in more detail. The videoconferencing unit 10 has a controller 200, which can include any conventional decoders/encoders, processors, and other electronic components known in the art and used for a videoconferencing unit. The controller 200 is coupled to an output 215 for video, an I/O interface 217 for user interface, and a memory 220 storing functions 222 (i.e., computer executable instructions). The controller 200 is also coupled to an input 216 for receiving video from a local camera 230 and an interface 231 for controlling the local camera 230. The video output 215 is coupled to a video input of the display 9, and the I/O interface 217 receives data from an I/O device 240, such as a remote control or other device operated by a user. For example, the I/O interface 217 comprises an IR detector which receives IR signals from an I/O device 240 comprising an IR transmitter, such that the I/O device 240 can send control data to the controller 200 via said I/O interface. In other embodiments, the I/O interface 217 comprise other wired or wireless communication means, such as Bluetooth, WiFi, cable connections, etc.

The controller 200 comprises a video codec 201 and a data processor 202. The video codec 201 is responsible for processing video data to be displayed by the display 9 and to be sent to remote endpoints of the videoconference. In general, the video data can include images (pictures) captured by the camera 230 of the unit 10, video from remote endpoints of the videoconference, content from a peripheral device (e.g., VCR, DVD player, computer, document camera, etc.), and other visual data. Operation of such a video codec 201 in the context of videoconferencing is well known in the art is not described herein.

The data processor 202 is responsible for processing data for the videoconferencing unit 10. This data includes data from the camera interface 231, communication data, commands (e.g. from the I/O interface 217), data from the Target point locator function 222, videoconference information, etc. The controller 200 is also coupled to a network interface 214, such as commonly used for a videoconferencing unit, and the network interface 214 couples to a videoconference network known in the art.

Figure 3:
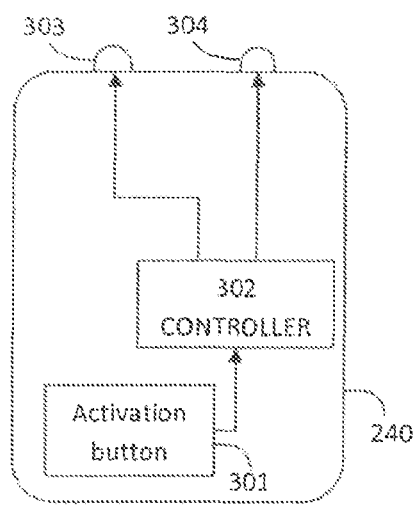
FIG. 3 is a schematic overview of a non-limiting embodiment of a targeting device.

FIG. 3 shows an I/O device 240 according to one exemplary embodiment. The I/O device 240 comprises at least an optical source 304 and a controller 302 for operating said optical source 304. The optical source 304 may be any optical source detectable by an optical sensor in the camera, for example a Light Emitting Diode (LED), Organic Light Emitting Diode (OLED), Laser diode, laser etc. The optical source may emit optical signals having a wavelength corresponding to that of visible light or emit optical signals in the infrared wavelength range.

According to one exemplary embodiment, the I/O device 240 further includes an activation button for activating the optical source 304. The I/O device 240 further includes a second optical source 303 emitting optical signals in the infrared wavelength range. The second optical source is used to transmit commands from the I/O device to the controller 200 of the videoconference unit 10 via the I/O interface 217. The second optical source is also operated by controller 302.

According to one exemplary embodiment, the I/O device is the standard remote control for operating the video conference endpoint 1.

According to one exemplary embodiment, the I/O device is a device separate from the standard remote control for operating the video conference endpoint 1.

According to one exemplary embodiment, the two optical sources 304, 303 are one common optical source operating in the infrared wavelength range.

The controller 200 controls operation of at least some features of the videoconferencing endpoint 1 using the operational function 222 stored in memory 220. This operational function includes a target point locator function 222. This operational function 222 is discussed in more detail later, but a general overview of the functions 222 is provided here.

The target point locator function 222 allows the videoconferencing unit 10 to determine the location of a target point provided by a user. The target point is the optical source 304, or alternatively a point illuminated by the optical source 304. The data processor 202, executing the target point locator function 222, processes one or a series of images/pictures (or sequence of images/pictures) captured by the camera 230, and determines the location of the target point within the picture. Further, the target point locator function 222 enables the data processor 202 to determine the displacement of the target point relative to a center point of the picture(s). The data processor 202, executing the target point locator function 222, calculates the amount of pan and tilt necessary to place the center of the image(s)/picture(s) in the target point location.

In one embodiment, the near camera 230 is a pan-tilt-zoom camera capable of panning, tilting, and zooming. One or more of the panning, tilting, and zooming capabilities of the local camera 230 can be accomplished by one or more mechanical actuators 402,403,405, as are used in the art for operating pan-tilt-zoom cameras of videoconferencing units. The interface 231 is coupled to the actuators 402,403,405, and the controller 200 controls operation of the panning, tilting, and zooming capabilities of the local camera 230 using control signals via the interface 231. Actuators 402,403,405 comprise position sensors, allowing the actuators to determine the current position of the cameras pan, tilt and zoom, relative to a reference position. The actuators or a controller located in the base 404 of the camera 203 report the current position of the cameras pan, tilt and zoom to the controller 200 at predefined instances, e.g. at predefined time intervals, when one of pan, tilt or zoom is performed, etc. The controller 200 can generate control signals to control the panning, tilting, and zooming of the near camera 230. Control of a pan, tilt, and zoom camera may be implemented in various ways, and one specific implementation of controlling actuators and providing position feedback should not be limiting to the scope of the present technological advancement.

Alternatively, the panning, tilting, and zooming capabilities of the near camera 102 may be electronically achieved. For example, the near camera 203 may have processing capabilities for panning, tilting, and/or zooming, and the controller 200 can control that processing using control signals via the camera interface 231.

According to one exemplary embodiment, the Controller 200, I/O interface 217 and memory 220 comprising the target point locator 222 is located in the base 404 of the camera 230. In this embodiment, the camera can control the pan, tilt, and zoom of the camera without communication with the video conferencing unit 10.

The video conference endpoint is preferably an H.323 or SIP endpoint if it is connected to an IP network or an H.320 endpoint if it is connected to an ISDN network. H.323 and H.320 are standards defined by the International Telecommunications Union.

Figure 4:
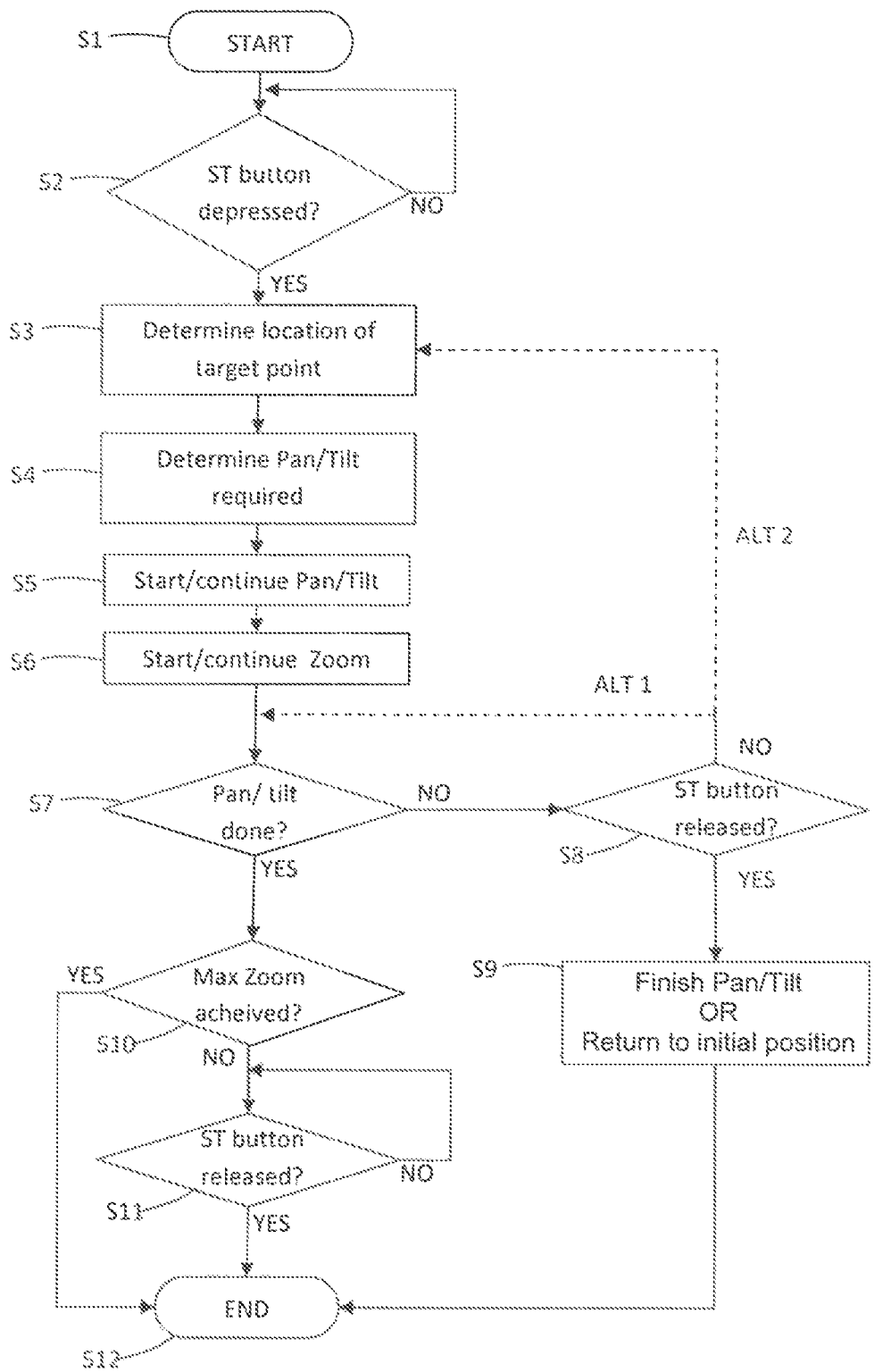
FIG. 4 is a flow chart of a non-limiting method for automatically adjusting a camera control associated with a video conferencing endpoint.

FIG. 4 is a flowchart illustrating the method for adjusting a camera according to one exemplary embodiment. According to one embodiment, an I/O device 240 associated with a local video conferencing endpoint is operated by a user of the local video conferencing endpoint. As mentioned above, the I/O device 240 comprises an optical source. If a user wishes to zoom the camera in to capture a close up of an object (e.g. a small object, piece of paper, image, etc) or a person, or to just center the cameras view on a point of interest, the user positions the I/O device 240 near or on the point of interest such that the optical source is at least partly visible to the local videoconference endpoint's camera.

The procedure illustrated in FIG. 4 is according to one embodiment implemented by controller 200. A starting step S1 is shown but it will be appreciated that controller 200 performs many operations and therefore a starting step should be understood to be an entry point into a subroutine, such as a subroutine used for adjusting the camera. In decision S2 a test is made as to whether an indication is received from a user that a target point has been provided. The indication can, for example, be that the activation button 301 on the I/O device 240 is depressed. Also, the indication may be controller 302 transmitting a signal, different from the pulses of electromagnetic radiation used to mark the target point, to the controller 200. If no indication is received (e.g. depression of the activation button) then a return is made to decision S2. If an indication that a Target point has been provided is found in S2, the controller 200 proceeds to step S3 to determine the location of the target point. The step S3 of determining the location of the target point comprises processing one or more consecutive images/pictures from the camera 230 to determine the location of the optical source (or point illuminated by the optical source) within the images/pictures. Methods for localizing the target point are discussed in more detail later.

In step S4, when the target point has been localized, the controller determines the pan and tilt required to center the cameras field of view on the target point (or location of the target point). This is determined by measuring the position of the target point with respect to the center of the processed picture(s), and the amount of zoom presently employed. If not already known, the controller may request the current position of the pan/tilt/zoom mechanism from the camera 230. The current zoom used is taken into account when calculating the amount of pan and tilt required to center the camera's view on the target point.

When the required pan and tilt has been determined, the controller instructs the camera to start panning and tilting the determined amount in step S5. The controller also instructs the camera to start zooming in step S6.

In step S7, a test is made as to whether the camera has finished panning and tilting (reached the point where the center the cameras field of view coincides with the target point). If the camera is not finished panning and tilting then, in step S8, a test is made as to whether an indication is received that the user wishes to stop adjusting the camera (e.g.

activation button 301 is released). If no indication is received (e.g. the activation button 301 is not released) then a return is made to step S7 (ALT1 in FIG. 4). Alternatively the controller repeats the steps S3-S7 to correct the required pan and tilt if, for example, the user has moved the target point or to verify/correct previous calculations (ALT1 in FIG. 4). If an indication is received (e.g. the activation button 301 is released), in step S9 the camera either, stops zooming and finishes the panning and tilting required to center the cameras field of view on the target point, or the camera returns to its initial pan/tilt/zoom position as before starting step S1.

If the camera is finished panning and tilting in step S7 then, in step S10 a test is made as to whether the camera has reached its maximal zoom, which is limited by the cameras mechanical zooming capabilities. If maximal zoom is reached, the process of adjusting the camera is ended in step S12. If maximal zoom is not reached, in decision S11 a test is made as to whether an indication is received that the user wishes to stop adjusting the camera (e.g. the activation button 301 is released). If an indication is not received (e.g. the activation button 301 is not released) then a return is made to decision S11. If an indication is received (e.g. the activation button 301 is released) then the controller instructs the camera to stop zooming and the process of adjusting the camera is ended in step S12.

According to another exemplary embodiment, the decisions in step S2, S8 and S11 are not based on whether a button is depressed or released, but rather an indication by the user to start the processes of adjusting the camera or end the process of adjusting the camera. Such an indication by the user may be, for example, the user pushing the activation button 301 once to start the process and then pushing the button again to end the process. The user may also use audible or visual indications to start and stop the process, e.g. voice command, finger/arm gestures detectable by the camera, etc.

According to yet another embodiment, if the camera is not finished panning and tilting in decision S7, a return is made to decision S7 instead of proceeding to decision S8.

According to one embodiment, the step S3 of determining the location of the target point is performed by analyzing two or more consecutive pictures captured by the camera. The camera captures images with a frame rate (the rate at which sequential frames are captured) of N frames per second (or N Hz), where N may be in the range 24-100. According to this embodiment, the controller 302 is configured to power the optical source 304 with a pulse train, or in some other appropriate way, such that the optical source emits short pulses (e.g. 0.1-5 ms) at a frequency M. The frequency M is half the frequency of the frame rate of the camera (M=N/2). This means that when the camera is capturing images/pictures (frames) of the optical source, every even numbered frame will comprise a lit optical source and every odd number frame will not comprise a lit optical source, or vice versa. By receiving two consecutive pictures (or frames) and using an image analysis method of subtracting one of said consecutive frames from the other frame, the result is a picture only comprising the optical source. Hence, the location of the target point (the optical source) can be determined.

According to another exemplary embodiment, other image analysis methods for detecting objects in an image may be used to localize the target point.

Figure 5A:
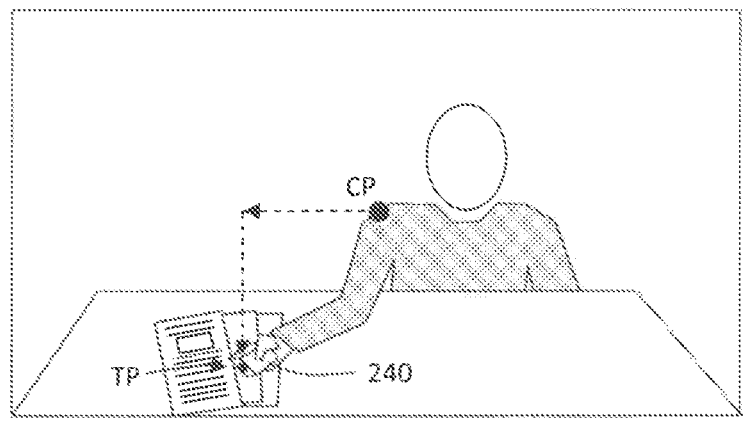
FIGS. 5a and 5b are illustrations of an exemplary operation of the automatic camera adjustment feature.
Figure 5B:
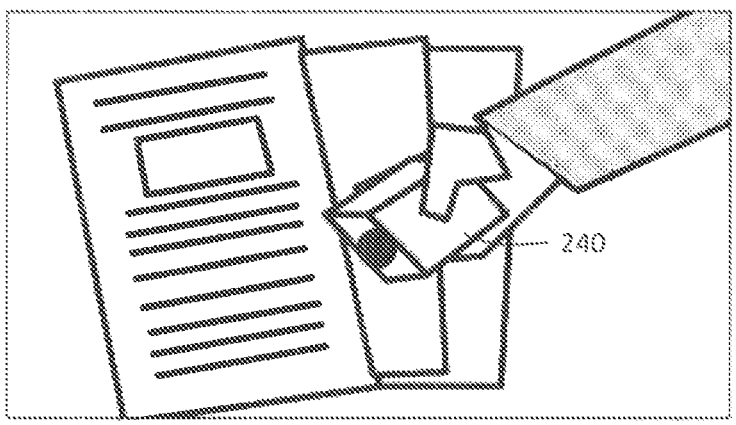

FIGS. 5a and 5b are illustrations of the operation of the automatic camera adjustment feature. FIG. 5a is an illustration of a image/picture captured by the camera 203, where the image/picture is to be displayed on a monitor 9 at a remote and/or local endpoint 1. The picture captured by the camera shows a person sitting at a table, and a number of documents resting on the table. Assume now that the user wishes to zoom in on the documents in order to show the content of the documents to remote participants. Using a conventional system the user would have to manually adjust the pan, tilt and zoom over several iterations using a conventional remote control. However, using one of the exemplary embodiments described herein, the user can simply hold the I/O device 240 in front of the documents and activate the automatic camera adjustment feature by pressing the activation button. When the user presses and holds the activation button, the optical source 304 will start emitting light detectable by the camera 230. The controller 200 will then determine the location of the target point (TP) provided by the optical source, and determine the appropriate pan and tilt for the camera, and cause the camera to center its field of view on the target point (TP). The controller is also causing the camera to zoom in, and the controller causes the camera to continue zooming in until the user indicates otherwise (e.g. releases the activation button). (As mentioned above the indication from the user for the starting and stopping of the automatic camera adjustment feature may be other than depressing and releasing the button.) The resultant picture captured by the camera is seen in FIG. 5b, which illustrates that the camera has been repositioned so that the target point (TP) is now in the centre of the picture (CP). Therefore, by the simple task of positioning the I/O device 240 on or near a spatial point of interest in a scene captured by the camera, the user has caused the camera to zoom in on the point of interest with a zoom factor selected by the user.

Alternatively, the method of controlling the camera may be implemented as a set of computer-readable instructions stored in an electronic memory, a hard disk drive, CD, DVD, FLASH drive or any other known non-transitory storage media.

The invention claimed is:

1. A method comprising:
    obtaining a sequence of pictures from a camera associated with a video conferencing endpoint;
    determining a presence of a target point coinciding with an optical source within a field of view of said camera, wherein the optical source emits pulses of electromagnetic radiation at a rate that causes the camera to capture some frames with a pulse of electromagnetic radiation from the optical source and some frames without the pulse of electromagnetic radiation from the optical source;
    determining a location of said target point within one or more of said pictures by comparing a first frame from the camera that includes the pulse of electromagnetic radiation from the optical source and a second frame from the camera that does not include the pulse of electromagnetic radiation from the optical source;
    moving said camera so that a center of one or more subsequent pictures obtained by said camera coincides with said target point; and
    zooming said camera until receipt of an instruction to stop zooming is received, or until maximal zoom is achieved.

2. The method according to claim 1, wherein the method further comprises:
    placing the optical source on or near a spatial point of interest, such that the optical source is captured in the field of view of said camera; and
    activating said optical source by pressing an activation button.

3. The method according to claim 2, wherein the method further comprises:

sending an indication to a controller that the target point has been detected in the field of view of the camera;
monitoring for a second indication that the target point has been provided; and
determining said location of the target point in response to said second indication.

4. The method according to claim 1, wherein the method further comprises:
illuminating a point on or near an object using the optical source, such that an illuminated point is within the field of view of said camera; and
sending an indication to a control device that the target point, coinciding with the illuminated point, has been provided.

5. The method according to one of claim 1, wherein said optical source is one of a Light Emitting Diode (LED), an Organic Light Emitting Diode (OLED), a Laser diode, or a laser.

6. The method according to claim 1, further comprising:
calculating an amount of at least one of pan and tilt needed to move a center of the one or more subsequent pictures obtained by said camera to coincide with said target point; and
instructing the camera to at least one of pan and tilt by said calculated amount.

7. The method according to claim 1, wherein said zooming further comprises:
instructing the camera to start zooming, panning and tilting simultaneously.

8. The method according to claim 1, wherein if the camera is finished panning and tilting, and zooming is still ongoing, rerun the determining the location and the moving.

9. A video conferencing endpoint comprising:
a video conferencing unit configured to obtain a sequence of pictures from a camera, wherein said camera is configured to pan, tilt, and zoom;
a targeting device including a optical source that emits electromagnetic radiation;
a first controller configured to determine a presence of a target point coinciding with the optical source within a field of view of said camera, wherein the optical source emits pulses of electromagnetic radiation at a rate that causes the camera to capture some frames with a pulse of electromagnetic radiation from the optical source and some frames without the pulse of electromagnetic radiation from the optical source, to determine a location of said target point within one or more of said pictures by comparing a first frame from the camera that includes the pulse of electromagnetic radiation from the optical source and a second frame from the camera that does not include the pulse of electromagnetic radiation from the optical source, to cause said camera to move so that a center of one or more subsequent pictures obtained by said camera coincides with said target point, and to cause said camera to zoom until receipt of an instruction to stop zooming is received, or until maximal zoom is achieved.

10. The video conferencing endpoint according to claim 9, wherein said targeting device comprises:
an activation button; and
a second controller configured to activate said optical source and to send an indication to said first controller that a target point has been provided, when the activation button is depressed.

11. The video conferencing endpoint according to claim 9, wherein said optical source is one of a Light Emitting Diode (LED), an Organic Light Emitting Diode (OLED), a Laser diode, or a laser.

12. The video conferencing endpoint according to claim 9, wherein said targeting device is a remote control used to operate said video conference endpoint, and said optical source is the remote control IR-transmitter or a dedicated LED.

13. A video conferencing endpoint according to claim 10, wherein
said camera is configured to capture images at a first rate N,
said targeting device is configured to emit the pulses of electromagnetic radiation a second rate M, and
said first controller is further configured to retrieve two or more consecutive pictures from said camera, and subtract one of said consecutive pictures from the others to find said target point location.

14. A video conferencing endpoint according to claim 13, wherein M=N/2.

15. A non-transitory computer readable storage medium encoded with instructions, which when executed by a computer causes the computer to implement a method comprising:
obtaining a sequence of pictures from a camera associated with a video conferencing endpoint;
determining a presence of a target point coinciding with an optical source within a field of view of said camera, wherein the optical source emits pulses of electromagnetic radiation at a rate that causes the camera to capture some frames with a pulse of electromagnetic radiation from the optical source and some frames without the pulse of electromagnetic radiation from the optical source;
determining a location of said target point within one or more of said pictures by comparing a first frame from the camera that includes the pulse of electromagnetic radiation from the optical source and a second frame from the camera that does not include the pulse of electromagnetic radiation from the optical source;
moving said camera so that a center of one or more subsequent pictures obtained by said camera coincides with said target point; and
zooming said camera until receipt of an instruction to stop zooming is received, or until maximal zoom is achieved.

* * * * *